Figure 1:
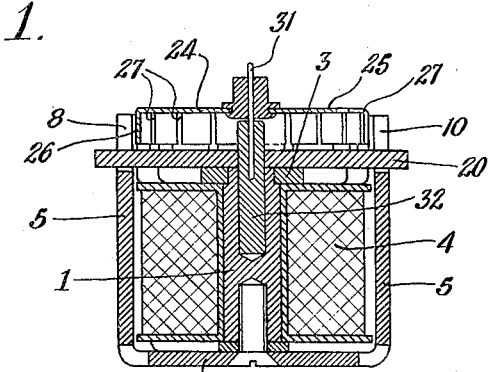

March 28, 1939.  E. SPAHN  2,151,996

SELF-STARTING SYNCHRONOUS MOTOR

Filed June 1, 1936

INVENTOR
Emil Spahn
BY
Morgan Finnegan and Durham
ATTORNEYS

Patented Mar. 28, 1939

2,151,996

UNITED STATES PATENT OFFICE 2,151,996

SELF-STARTING SYNCHRONOUS MOTOR

Emil Spahn, Zug, Switzerland, assignor to Landis & Gyr, A-G., a corporation of Switzerland Application June 1, 1936, Serial No. 82,779
In Switzerland August 22, 1935

3 Claims. (Cl. 172—275)

The present invention relates to novel and useful improvements in small self-starting synchronous motors having a high starting torque and more particularly to such improvements in the structure and characteristics of the rotor.

Objects and advantages of the invention will be set forth in part hereinafter and in part will be obvious herefrom, or may be learned by practice with the invention, the same being realized and attained by means of the instrumentalities and combinations pointed out in the appended claims.

The accompanying drawing, referred to herein and constituting a part hereof, illustrates my present preferred embodiment of the invention, and together with the description, serves to explain the principles of the invention.

Figure 2:
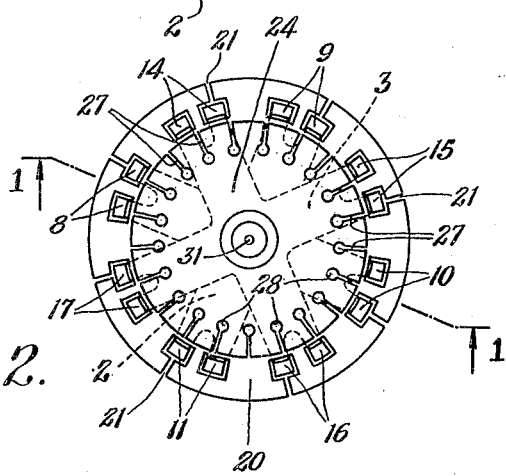

Of the drawing:

Fig. 1 is a vertical cross section taken on the line 1—1 of Fig. 2 and showing a typical self-starting synchronous motor in accordance with the present invention; and Fig. 2 is a plan view of the motor shown in Fig. 1.

An object of the present invention is to provide a novel and improved small, self-starting synchronous motor having a high starting torque, and to provide in such a motor which has a stator with more than two split poles, a novel rotor characterized by simplicity, lightness, and increased efficiency; to provide an improved rotor which gives a very high starting torque, and has a high degree of magnetic saturation and therewith an increased remanence, whereby the starting torque caused by the hysteresis is increased, the rotor achieving these improved results without the use of a short-circuited winding. In accordance with certain features of the invention, the foregoing results are realized by using a cap-shaped rotor made of very thin sheet steel, having narrow slits in its circular peripheral portion and having no stamped out or pronounced poles, and not having a short-circuited winding.

Thus a simpler, lighter, cheaper and more efficient rotor is provided, as not only is the weight of the short-circuited winding eliminated, but the synchronous torque is greater because of elimination of the damping action caused by the elliptical rotary field of such a winding. The very thin, sheet steel cap shaped rotor, having the structure and characteristics described is not only simple and inexpensive to manufacture, but by its lightness obviates wear of bearings. The present embodiment is incorporated in a motor such as is shown in British Patent No. 418,174 and in certain of its aspects this invention is an improvement on the type of motor shown and described in said patent.

It will be understood that the foregoing general description, and the following detailed description as well, are exemplary and explanatory of the invention but are not restrictive thereof.

Referring now in detail to the embodiment of the invention illustrated by way of example in the accompanying drawing, the driving system of the motor comprises an iron core 1, and fixed thereto at either end are cross-shaped pole pieces 2 and 3, the arms of the two pole pieces being off-set at equal angles. A suitable exciting coil 4 is wound upon the core 1. The ends of the four arms of pole piece 2 are bent at a right angle and are spaced from and extend along and past the outside of the coil 4, as shown at 5, and each arm terminates in a pair of divided poles, the sets of these divided poles at the ends of the arms of pole piece 2 being indicated respectively by reference numerals 8, 9, 10 and 11, the end of each arm being medianly slotted to form the divided pole. In like manner the ends of the four arms of pole piece 3 are bent upwardly at a right angle away from the flat face of the coil 4, and the ends of these four arms of pole piece 3 are also bifurcated to constitute divided poles, the four sets being indicated by reference numerals 14, 15, 16 and 17. The eight sets of divided poles project through corresponding spaced openings in a copper ring 20 mounted on the end of the core 1. The alternate openings in the ring 20 are slotted out to the periphery of the ring, that is, there is a slotted opening 21 for one member of each of the divided poles, whereby two fluxes displaced relatively to one another in phase are produced, said fluxes together forming an eight pole rotary field.

The rotor 24 is journaled by a spindle 31 in a pin 32, set in the core 1. The rotor is made of thin sheet steel, is of cap shape, having a central flat disc-like portion 25, and an outer integral circular peripheral portion 26. This cylindrical portion 26 is formed with narrow slits 27 formed longitudinally thereof. They are uniformly spaced apart and parallel to each other, and extend entirely across the cylindrical portion 26 and terminate in slightly larger openings 28 in the outer part of flat disc 25, but these openings in the rotor do not form definite or pronounced poles. The rotor is preferably formed by drawing from a sheet of hardened steel, only a few tenths of a millimeter in thickness, as this material produces a high remanence and increases the magnetic saturation obtainable; it furthermore provides a very light and strong rotor having very little weight and causing very little wear of the bearings.

It will be understood that the details of construction may be varied within the scope of the accompanying claims without departing from the principles of the invention and without sacrificing its chief advantages.

What I claim is:

1. A synchronous motor for clocks and other small power operations, including a multi-polar stator having split poles for energization by a single phase alternating current supply to produce a rotary field, a rotor consisting of a cap-shaped disc having a cylindrical peripheral portion with which the stator poles cooperate, said disc being thin sheet steel having a very high degree of magnetic saturation and therewith a higher degree of magnetic remanence sufficient to produce in cooperation with the stator rotary field a strong rotational moment sufficient for starting the rotor and bringing it to a synchronous speed, whereby a light-weight, self-starting rotor is provided which will start without supplementary regulation such as short circuiting windings with their damping action as well as increase in weight, and said disc being provided with a plurality of slits extending through the cylindrical peripheral portion and inwardly thereof which slits are so placed with reference to the stator poles and are so narrow that no marked poles result therefrom but function to prevent slip of the remanent poles and maintain a synchronous speed of the rotor the same as that of the stator rotary field.

2. In a self-starting synchronous motor having a multi-polar stator for producing a rotary field, a rotor comprising a disc-like sheet steel member having a high degree of magnetic saturation and therewith a high magnetic remanence sufficient to produce in cooperation with the stator rotary field which cooperates with the peripheral portion of the disc, a high starting torque by the hysteresis whereby short circuiting windings are unnecessary, and said rotor disc having a plurality of narrow slits extending through the peripheral portion of the rotor and inwardly thereof beyond the stator cooperating portion, and each slit terminating in an enlarged opening producing a closely spaced multiplicity of relatively long circumferential rotor elements effective to prevent slip of remanent poles and maintain a synchronous speed of the rotor the same as that of the stator rotary field.

3. A synchronous motor for clocks and other small power operations, including a multi-polar stator having split poles for energization by a single phase alternating current supply to produce a rotary field, a rotor consisting of a disc having a peripheral portion with which the stator poles cooperate, said disc being thin sheet steel having a very high degree of magnetic saturation and therewith a higher degree of magnetic remanence sufficient to produce in cooperation with the stator rotary field a strong rotational moment sufficient for starting the rotor and bringing it to a synchronous speed, whereby a light-weight, self-starting rotor is provided which will start without supplementary regulation such as short circuiting windings with their damping action as well as increase in weight, and said disc being provided with a plurality of slits extending through the peripheral portion and inwardly of the disc beyond the portion cooperating with the stator poles which slits are so placed with reference to the stator poles that the peripherally spaced elements formed thereby do not coincide with said stator poles, and are so narrow that no marked poles result therefrom but function to prevent slip of the remanent poles and maintain a synchronous speed of the rotor the same as that of the stator rotary field.

EMIL SPAHN.